H. MANWARING.
Thill-Couplings.
No. 145,516.
Patented Dec. 16, 1873.
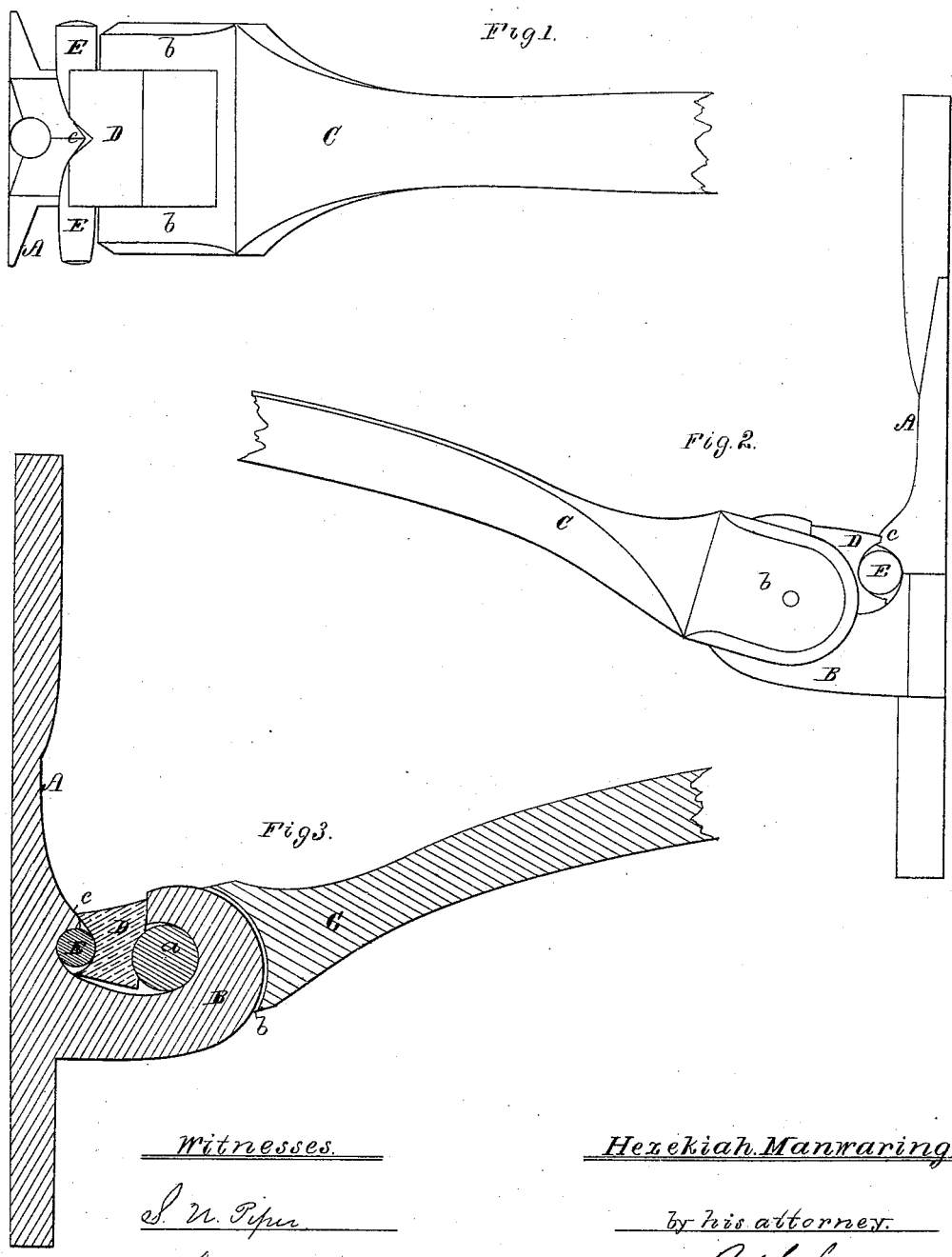
Witnesses.
S. N. Piper
L. N. Miles.
Hezekiah Manwaring
by his attorney.
R. H. Eddy

UNITED STATES PATENT OFFICE.

HEZEKIAH MANWARING, OF DANVILLE, KENTUCKY.

IMPROVEMENT IN THILL-COUPLINGS.

Specification forming part of Letters Patent No. 145,516, dated December 16, 1873; application filed September 3, 1873.

*To all whom it may concern:*

Be it known that I, HEZEKIAH MANWARING, of Danville, of the county of Boyle and State of Kentucky, have invented a new and useful Improvement in Carriage-Shaft Couplings; and do hereby declare the same to be fully described in the following specification and represented in the accompanying drawings, of which—

Figure 1 is a top view, Fig. 2 a side elevation, and Fig. 3 a longitudinal section, of a coupling having my improvement.

In carrying out my invention, I construct the clip or yoke A, which is to embrace the axle, with a bearing-hook, B, to extend from such clip, in manner as shown. The connection-piece C of the shaft I make furcated, as shown, to embrace the hook B and support a joint-pin, $a$. This joint-pin is to be fixed in the prongs $b\ b$ of the fork, and to extend from one to the other of them. When in the bearing-hook, there rests against the joint-pin $a$ a block or elastic mass, D, of vulcanized india-rubber, formed and arranged within the hook, as shown. Such mass D of rubber is held in place by a projection, $c$, from the yoke, and by a wedge or tapering pin, E, arranged under such projection and between the yoke and the mass of rubber. The pin E, on being driven in, will contract the rubber, (which is recessed to receive the pin,) and will force it against the joint-pin, so as to cause the latter to fit closely to its bearing in the hook, and to work with little or no noise. The friction and elasticity of the rubber will serve to keep the wedge or pin E from accidentally getting out of place.

This coupling enables the shaft to be readily detached from the axle, or to be as easily applied thereto, as occasion may require, and, besides, it constitutes practically a noiseless joint.

The clip or yoke, when in use, is to be bent about the axle, and secured thereto by screws and nuts, in a manner well understood by carriage-builders.

I claim as my invention—

The improved shaft-coupling consisting of the elastic bearing-block D and the holding-pin E, in combination with the furcated connection C having joint-pin $a$, and the clip or yoke A having the hook B and the projection $c$, essentially in the manner and for the purpose specified.

H. MANWARING.

Witnesses:
GEORGE SMITH,
C. E. FARRAND.